(12) United States Patent
Hartley

(10) Patent No.: US 7,722,219 B2
(45) Date of Patent: May 25, 2010

(54) COMBINATION CORD-STOP AND LIGHT DEVICE

(76) Inventor: Scott Hartley, 5045 SW. 26th Pl., Portland, OR (US) 97239

(*) Notice: Subject to any disclaimer, the term of this patent is extended or adjusted under 35 U.S.C. 154(b) by 0 days.

(21) Appl. No.: 12/328,160

(22) Filed: Dec. 4, 2008

(65) Prior Publication Data
US 2009/0173455 A1 Jul. 9, 2009

Related U.S. Application Data

(60) Provisional application No. 61/018,915, filed on Jan. 4, 2008.

(51) Int. Cl.
*F21V 33/00* (2006.01)

(52) U.S. Cl. .................... 362/253; 362/103; 362/800; 24/115 G

(58) Field of Classification Search .............. 362/103, 362/800, 253, 396, 394, 457
See application file for complete search history.

(56) References Cited

U.S. PATENT DOCUMENTS

| | | | |
|---|---|---|---|
| 2,671,847 A * | 3/1954 | Lerch | 362/103 |
| 3,733,478 A * | 5/1973 | Barker | 362/387 |
| 5,263,202 A | 11/1993 | Siberell | |
| 5,711,032 A | 1/1998 | Carpenter | |
| 5,738,432 A * | 4/1998 | Okko et al. | 362/103 |
| 5,746,500 A * | 5/1998 | Chien | 362/103 |
| 6,848,802 B2 * | 2/2005 | Chen | 362/85 |
| 7,025,471 B2 | 4/2006 | Gorrie et al. | |
| 7,201,492 B2 | 4/2007 | Galli | |
| 7,254,871 B2 | 8/2007 | Yoshiguchi | |
| 7,255,468 B2 * | 8/2007 | Capriola | 362/570 |
| 7,357,540 B2 | 4/2008 | Booty, Jr. | |
| 7,434,955 B2 | 10/2008 | Vickers et al. | |
| 7,438,431 B2 | 10/2008 | Ford et al. | |
| 2002/0135999 A1 * | 9/2002 | Chen | 362/116 |
| 2004/0100792 A1 * | 5/2004 | Trzecieski | 362/103 |
| 2007/0109769 A1 * | 5/2007 | Booty, Jr. | 362/116 |
| 2008/0253108 A1 * | 10/2008 | Ellenburg et al. | 362/103 |

* cited by examiner

*Primary Examiner*—Laura Tso
(74) *Attorney, Agent, or Firm*—Peter A. Haas, Esquire LLC

(57) ABSTRACT

The present invention consists of an improvement to a traditional cord-lock device. The combination cord-lock and light device of the present invention consists of a housing having a plunger and locking device including a biasing member and further adapted to encapsulate a light-emitting diode circuit assembly. The circuit assembly includes a switch mechanism coupling to an activator button located on the exterior of the cord-lock housing. The switch mechanism enables the LED to operate in a steady state, off, or in a pulsating mode. The housing is further adapted to direct the LED light exterior to the device.

11 Claims, 4 Drawing Sheets

COMBINATION CORD-STOP AND LIGHT DEVICE

PRIORITY CLAIM

The present is a continuation-in-part application and claims benefit under 35 USC Section 119(e) of U.S. Non-provisional Patent Application Ser. No. 61/018,915 filed on 4 Jan. 2008. The present application is based on and claims priority from these applications and shares a common inventor and the disclosure is hereby expressly incorporated herein by reference.

BACKGROUND

The present invention relates to a combination light and cord-lock device.

Cord locking devices prevent longitudinal movement of the device on a rope, line, string, other similar cord. Conventionally, a cord lock device includes an interior channel or passage through which a cord passes, a self-locking mechanism for retaining the device in fixed location relative to the cord and further adapted to prevent movement of the device relative to the longitudinal axis of the cord, and a release mechanism for selective releasing of the lock mechanism.

A representative cord lock with depressible plunger, described by Boden in U.S. Pat. No. 4,288,891 issued on 15 Sep. 1981 includes a spring-resisted plunger that selectively retracts inwardly relative to the body when sufficient pressure is applied to the plunger. The plunger includes an interior passage that aligns with a corresponding interior passage of the cord-lock body when the plunger is depressed. When released, the plunger extends from the body and the two passages become mis-aligned. This mis-alignment, accordingly, causes an inserted cord to become lodged (or locked) in the device and, thus, preventing movement of the device relative to the longitudinal axis of the cord.

Although the art represented by Boden has improved, the basic cord-lock device and its operation remains, in essence, unchanged. Improvements include the cord lock of Bakker described in U.S. Pat. No. 4,453,292 issued on 12 Jun. 1984 wherein the cord lock device consists of only three pieces including a a molded plastic cylinder, molded plastic piston, and a biasing spring.

Another improved cord-lock, described by Krauss in U.S. Pat. No. 4,622,723 issued on 18 Nov. 1986, includes a rectilinear closed bottom molded housing member, a one-piece molded insert plunger, and internal spring.

Yet another improved cord-lock, described by Maurai in U.S. Pat. No. 4,839,946 issued on 20 Jun. 1989, includes a two-piece device including a molded socket with a pair of resilient flaps, and a one-piece molded plug with wedge-shaped end portion engaging the resilient flaps.

In each of the known cord-lock devices, and generally in the state-of-the-art cord-lock devices, little improvement to extending the functionality of cord-locks has been attempted. Although cord locks are well-suited to various applications including in garments and transport containers to keep, for example, pockets or compartments closed, little effort has been extended to make a traditional cord-lock serve additional functions. One function overlooked in the prior-art is adding a light source to the cord lock. One advantage of such a light source includes utilization in the garment industry where active garments needing a secure means for closing pockets, flaps, and the like, could further assist the wearer by providing an illuminating or safety-warning light. Thus, there is a need for a cord-lock device that includes a light source.

Some known combination devices combining a light with another function include the portable light with clip disclosed by Ford et al. in U.S. Pat. No. 7,438,431 issued on 21 Oct. 2008. Ford discloses a portable light comprising at least one light emitting diode, a power source, a switch operable for closing an electronic circuit between the power source and the LED and a body adapted to receive the LED, the battery and the switch and the body further comprising a loop portion towards one end. This structure, similar to a carabiner used in mountaineering or as a decorative key-fob, is well known in the art for quick attachment to a line or cord without locking to the cord and allows the cord to slide freely therethrough and does not lock to the cord by design.

Another example of a combination light and clip device includes the compact flashlight disclosed by Booty, Jr. in U.S. Pat. No. 7,357,540 issued on 15 Apr. 2008 wherein a compact flashlight is configured such that it can be coupled to a key ring or other devices and includes a locking mechanism that inhibits accidental opening and detachment from the ring or other device.

Yet, despite combination of flashlight-like devices there remains a need for a combination device that provides the cord-lock security of clasping a line or rope combined with the convenience of a small, portable light device. Such a device should provide superior cord or line locking ability, readily adapt to existing clothing, garments, outerwear or other gear-bags and the like, be able to readily be incorporated in the factory or in the field, and provide selectable operation of a compact, energy-efficient light source. And, because such devices will be used on a variety of outdoor garments and gear, any improved combination device should be rugged and water resistant.

SUMMARY OF THE INVENTION

The present invention adapts a conventional cord-lock device to include a light source, which can be used as a visibility aid in low-light conditions—making the wearer of a garment equipped with a novel cord-lock and light combination device of the present invention more visible when running at night, for example.

Other applications include illumination or signaling for military or recreational use and include these examples: Adaptable for use with a backpack or stuff sack for closure and illumination of internal contents; Use with hooded garments, hats and jackets with draw or cinch strings, the present invention provides captured closure and task illumination or personal be seen safety light when walking jogging or biking; and Use with sleeping bag sacks as an illumination tool and closure aid.

Other advantages of the present invention include providing increased visibility to hikers, joggers, runners, backpacker, campers, climbers and the like by providing a lightweight, water-resistant, compact light source that readily attaches to existing cords and lines of garments and gear combined with a pulsating operation mode, or selective high-power, or low-power steady state one settings.

DRAWING

DESCRIPTION OF THE INVENTION

Possible embodiments will now be described with reference to the drawings and those skilled in the art will understand that alternative configurations and combinations of components may be substituted without subtracting from the invention. Also, in some figures certain components are omitted to more clearly illustrate the invention.

Figure 1:
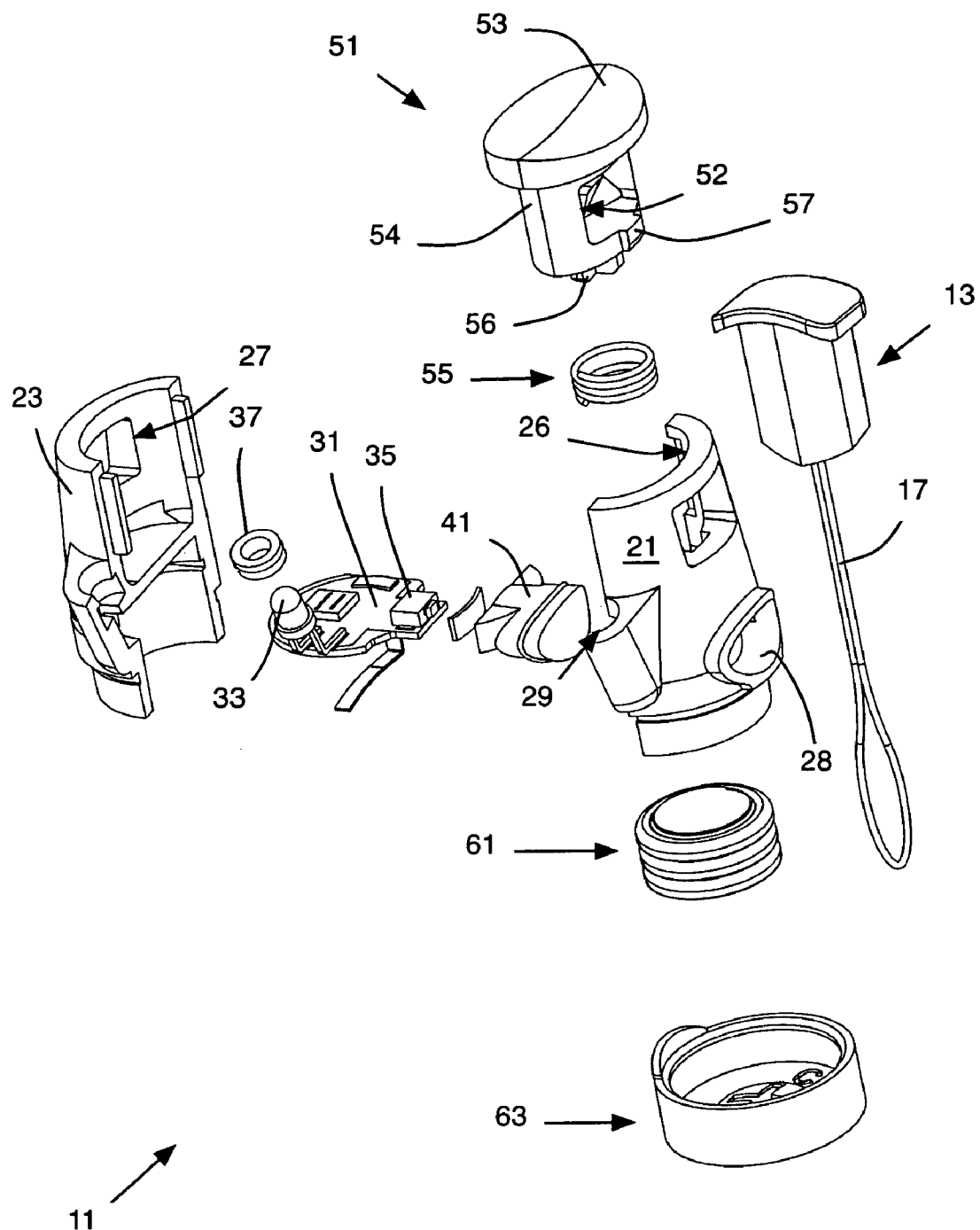
FIG. 1 is an exploded right side-view of one embodiment according to the present invention.

FIG. 1, a preferred embodiment of the present invention, illustrates an improved cord-lock device. The improvement consists of a light-emitting diode (LED). Accordingly, a polycarbonate housing 21 consisting of a left-side housing member 23 and a mating right-side housing member 25, while maintaining traditional features associated with known cord-locks, is further adapted to include internal features adapted to receive a circuit assembly 31, a power source 61, an enclosure 29 for the LED light source 33 and an externally operable activator button 41.

As would be well-appreciated by those skilled in this art, the housing body 21 includes a port 27 or passage adapted to enable a cord to pass there-through. To act as a lock, preventing movement of the cord once inserted in the opening 27, a plunger assembly 51 consisting of a clamp member 53 and biasing means 55, such as a compression spring and operate under principles well understood in the art.

As FIG. 1 further shows, the device 11 includes an on-board power source 61 such as a lithium ion battery, or stack of batteries. In a preferred embodiment, the power source comprises an in-series stack of two coin-type lithium-ion batteries generally available in the marketplace under brand names including Energizer brand or equivalent, size designation ANSI-5012LC or IEC-CR1220: However, other configurations and combinations are also contemplated, as a single battery, two-stack, or three-stack would work equally well depending on the desired light intensity, duration of battery life, and weight constraints considered. A battery cover 63 adapts to fit on the bottom end of the housing 61 and attaches by means well-understood in the art including a screw-type engagement or a snap-fit engagement, for example.

The light-emitting diode circuit 31 includes a board adapted to fit inside the housing 21 and a light-emitting diode 33 adapted to project light external to the housing. The diode is selectively activated by an activating button 41, a portion of which extends exterior to the housing. The button 41 adapts to engage a switch on the circuit board 31 to operate the LED. The LED may operate between an on (steady) state and an off state. In a preferred embodiment, however, the LED has several operating conditions including off, steady-state on, and a pulse mode. In the pulse mode the LED sequences between on and off at a rapid rate. The interval between on and off and the amount of time on can be pre-programmed in the device and several pulse profiles can be pre-loaded in the circuit's memory and activated by the external activator 41.

Figure 2:
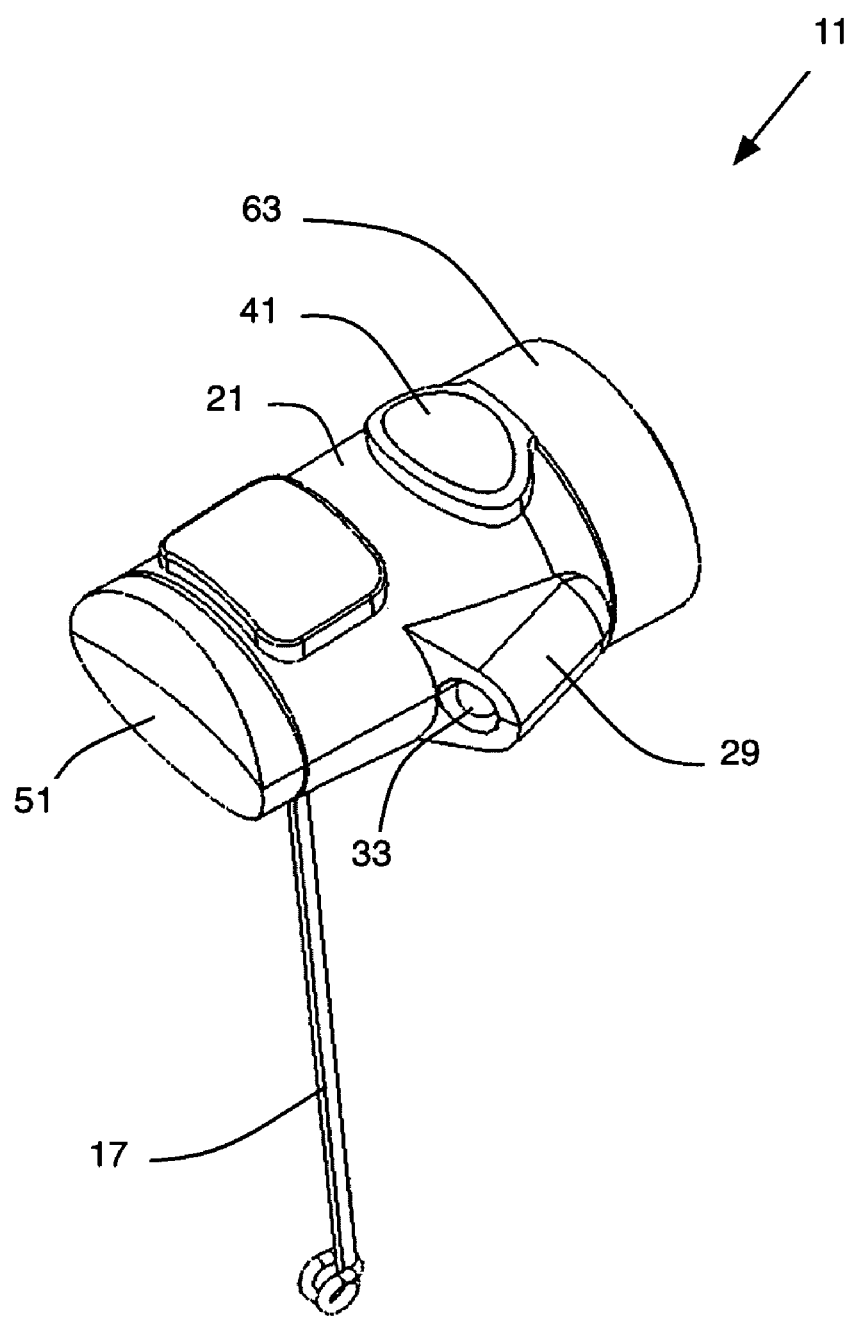
FIG. 2 is an offset right side-view of another embodiment according to the present invention.

The combination cord-lock and light device 11 of the present invention may further be adapted for use with garments and carry bags such as backpacks and the like. Accordingly, the body 21 includes features that enable an external cable 17 to attach and thereby enable the device 11 to be secured to a garment or bag even if a cord is not present. FIG. 2 shows one possible cable 17 attached to a modified plunger assembly 51. In this embodiment the plunger assembly is forced in a closed position and, for example, the cable 17 may be strung through an opening on a zipper and looped around the body 21 to secure the cord lock to the garment or bag.

Figure 3:
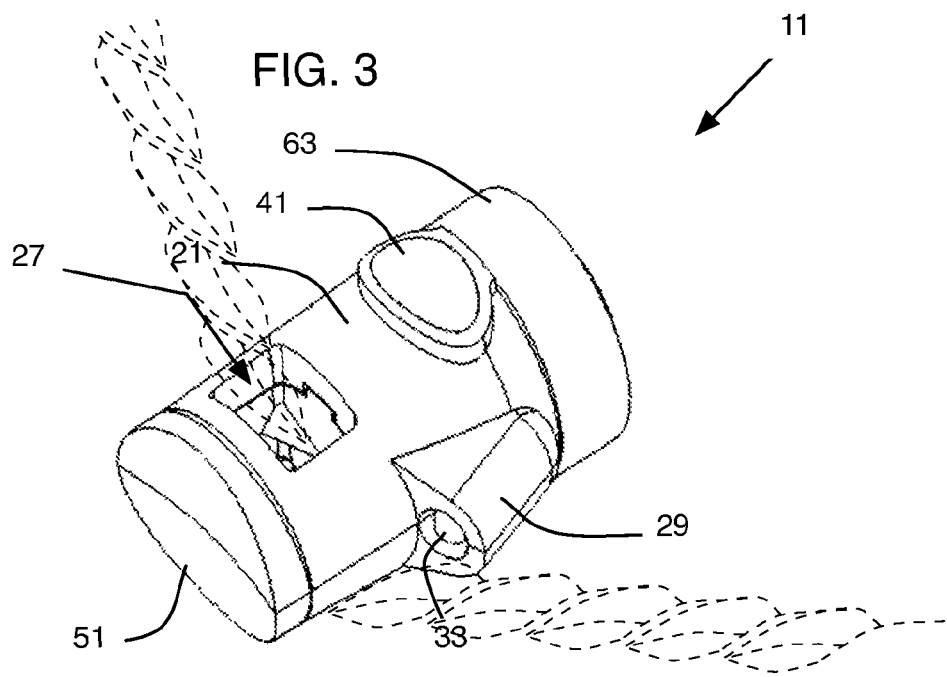
FIG. 3 is an offset right side-view of the embodiment of FIG. 1 in a first position.
Figure 4:
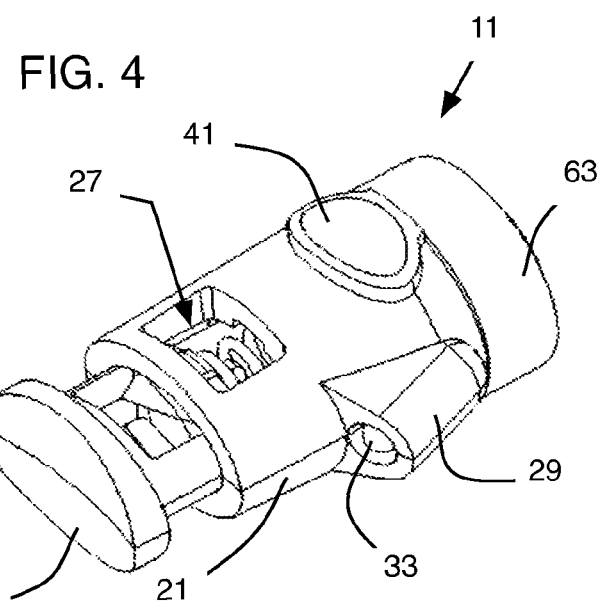
FIG. 4 is an offset right side-view of the embodiment of FIG. 3 in a second position.

FIGS. 3 and 4 illustrate a combination cord lock and light device 11 of another preferred embodiment of the present invention. In the depressed or compressed position of FIG. 3 sufficient force has been applied to the plunger assembly 51 to compress the biasing spring 55 (of FIG. 4). This provides a passage through the entire width of the body 21 at the cord-port 27 whereby an external cord may be inserted. FIG. 4 shows the same device 11 in an extended position. Here the biasing spring 55 returns to its normal position, forcing the plunger 53 to extend away from the body 21 and closing the port 27—this operation is well-defined in the prior art.

The improvement of a preferred embodiment of the present invention includes a light emitting diode (LED). Accordingly, the body 21, as FIGS. 3 and 4 illustrate, includes an LED-enclosure and port 29 that enables the LED 33 to project light exterior to the housing.

The entire device 11 or portions of the device including the power source and LED circuit may be sealed in a water-tight enclosure to enable operation in wet environments. Various LED frequencies are contemplated. For recreational users, a white or NGV (consisting of Green A, Green B, Yellow, Red, Blue, and NVIS White) LED is contemplated. For military and police use, an ultra violet or infra red device LED is contemplated. A laser-pointer is also contemplated.

In one contemplated preferred embodiment of the present invention the housing 21, plunger 53, enclosure 29, and battery cap 62 are molded from polycarbonate. Alternately, the battery cap can be molded from silicone rubber. The spring 55 consists of stainless steel. And, the activator button 41 consists of silicone rubber.

The plunger 53, further adapts to receive an industry standard plug-insert 13 with an associated pull-tang 17. This insert 13 enables the present invention to adapt itself for use with existing garment zippers, for example.

Figure 5:
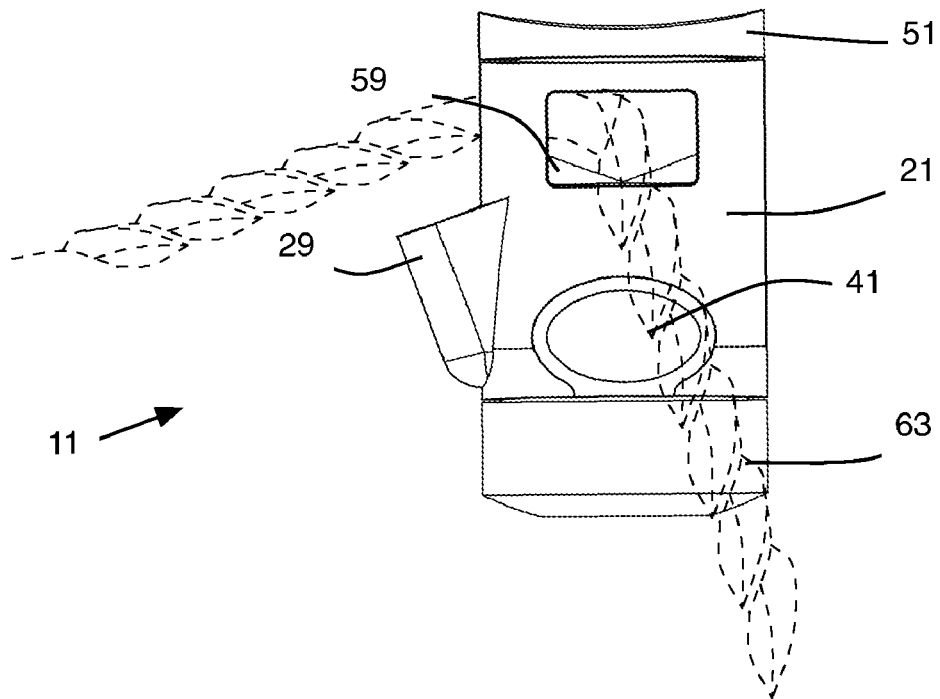
FIG. 5 is a front view of another preferred embodiment of the present invention illustrating a second, extended position.
Figure 6:
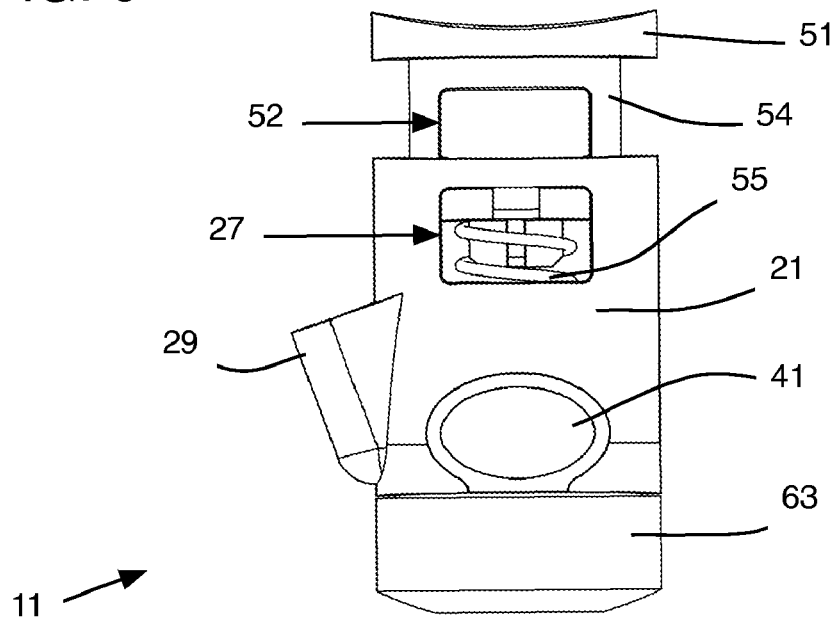
FIG. 6 is a front view of the embodiment of FIG. 5 in a first, retracted position.

FIGS. 5 and 6 illustrate the combination device 11 of the present invention in a retracted and extended position, respectively. The biasing means, such as coil-wound spring 55 exerts pressure on the plunger assembly 51, thus presenting the plunger in the extended position normally, until an overcoming force is exerted (such as a user pushing a finger or pinching the housing and plunger toward each other). The biasing means provides sufficient force to frictionally and mechanically retain a segment of cord provided by the user between the window 28 of the housing 21 and the corresponding opening 52 of the plunger assembly 51. Retention of the cord is further enhanced by a pair of oppositely positioned and cooperating v-notch tabs 59 formed during molding of the male plug 54. Other known and well-understood retention feature and mechanisms are contemplated in alternative embodiments of the present invention.

One preferred embodiment of the present invention contemplates a combination light and cord-lock for receiving a cord or line. The combination device 11 comprises a light-emitting diode assembly and a cord-lock. The light-emitting diode assembly comprises a LED 33 in communication with a circuit board 31 in communication with a power source 61 and a single switch 35 in communication with the circuit board, the single switch including an external button 41 whereby selective manipulation of the single switch by means of the external button causes the LED to selectively operate.

And, the cord-lock comprises a housing 21 encapsulating the light-emitting diode assembly and the housing comprises a first port 29 for the LED 33 and a second port 28 for enabling operation of the external button of the light-emitting diode assembly. The housing further comprises an open top portion defined by at least one vertical wall 26, the wall further including a pair of horizontally aligned and oppositely disposed apertures 27.

Additionally in the first preferred embodiment, a plunger 51 adapts to selectively and slideably engage the open top portion of the housing. The plunger is operable between a first, depressed position and a second, extended position. The plunger comprises a top member 53 coupled to a male plug 54. The male plug includes a through hole 52 disposed to align with the apertures of the housing when the plunger is operated in the first, depressed position and the plunger adapts to cooperate with the housing to retain the cord or line in fixed position when the plunger is in the second, extended position. The plunger couples to a biasing means, which in turn, couples to a surface provided by the open top portion of the housing. Retention tabs 56 on the plunger enable a snap-type fit of the plug to the spring biasing means. Similarly, retaining tab members (not shown in the figures) are included in the housing to lock the biasing means in relative position. Also, the plunger includes a retaining ember 57 to prevent over-travel in the extended position.

To facilitate replacing the coin-style batteries or other power source 61, the housing further includes an open bottom portion defined by the at least one sidewall separating the open-top where the spring sits from the circuit board and power source. The bottom portion adapts to receive the power-source of the light-emitting diode assembly and an end cap 63 adapts to selectively cover an opening defined by the at least one side wall adjacent to the open bottom portion.

The LED circuit assembly includes an internal switch mechanism 35 coupled to an external switch 41 and enables selective operation of the LED between operating positions including a high-on, a low-on, a pulse-on, and an off position.

The plunger includes a top portion 53 that facilitates depressing of the plunger and provides a more ergonomic grip.

The housing 21 includes an opening and surrounding structure 29 for the LED 33. This opening, moreover, is offset from a vertical axis of the housing. A contemplated range of offset includes presenting the LED in line (0-degree offset, or parallel to the housing vertical axis) with the housing to perpendicular to the housing (about 90-degrees from the vertical axis). In a preferred embodiment the second offset axis is within a range of about 15-degress to about 65-degrees from the first, vertical axis.

A preferred embodiment of the present invention contemplates a water resistant combination cord-lock and light device. Accordingly, a suitable material for the housing 21 includes Polycarbonate or Polycarbonate Blends or Acrylonitrile butadiene styrene, ABS or ABS blends, which are well-adapted to injection molding including a part line dividing the housing into two halves 23 and 25. The end cap 63, external switch 41, and various sealing members including seal 37, in this preferred embodiment, comprise elastomers (synthetic or natural), a resilient and deformable material, available from Bayer Plastics, Dow Corning or under the trademark name Santoprene brand thermoplastic vulcanizates. Various visible spectrum colors and non visible wavelengths in Inferred and ultraviolet of LED elements including laser generated emissions are also contemplated. In one preferred embodiment a bright white LED consists of a 3 mm diameter that emits the color white at a luminous intensity of about 12,000 mcd with a viewing angle of 2½ degrees manufactured by A-Bright Industrial CO., LTD, part number AL-314W5C.

In a preferred embodiment, the combination device 11 is a high-visibility color. In other contemplated embodiments, the housing may be colored in other fashionable or desired colors.

Although the invention has been particularly shown and described with reference to certain embodiments, it will be understood by those skilled in the art that various changes in form and detail may be made without departing from the spirit and scope of the invention.

I claim:

1. A combination light and cord-lock for receiving a cord or line, the combination comprising:
    a light-emitting diode assembly and a cord-lock wherein,
    the light-emitting diode assembly comprises a LED in communication with a circuit board in communication with a power source and a single switch in communication with the circuit board, the single switch including an external button whereby selective manipulation of the single switch by means of the external button causes the LED to selectively operate; and wherein
    the cord-lock comprises
    a housing encapsulating the light-emitting diode assembly and the housing comprising a first port for the LED and a second port for enabling operation of the external button of the light-emitting diode assembly, the housing further comprising an open top portion defined by at least one vertical wall, the wall further including a pair of horizontally aligned and oppositely disposed apertures;
    a plunger adapted to selectively and slideably engage the open top portion of the housing, the plunger being operable between a first, depressed position and a second, extended position, the plunger comprising a top member coupled to a male plug, the male plug including a through hole disposed to align with the apertures of the housing when the plunger is operated in the first, depressed position whereby the plunger being adapted to cooperate with the housing to retain the cord or line in fixed position when the plunger is in the second, extended position; and
    a biasing means coupled to the plunger and adapted to couple to a surface provided by the open top portion of the housing.

2. The combination of claim 1 wherein the cord-lock housing further comprises:
    an open bottom portion defined by the at least one sidewall, the bottom portion being adapted to receive the power-source of the light-emitting diode assembly; and
    an end cap adapted to selectively cover an opening defined by the at least one side wall adjacent to the open bottom portion.

3. The combination of claim 1 wherein the switch, cooperating with the exterior button, further comprises:
    being selectively operable between operating positions including a high-on, a low-on, a pulse-on, and an off position.

4. The combination of claim 1 wherein the plunger further comprises:
    a retaining member being adapted to limit a range of motion of the plunger between the first and second positions whereby the plunger is prevented from being separated from the housing.

5. The combination of claim 1 wherein the plunger further comprises:
    a securing member adapted to facilitate coupling of biasing member to plunger.

6. The combination of claim 1 wherein the plunger further comprises:

a v-shaped bottom portion coupled to a wall defining the through hole.

7. The combination of claim 1 wherein the plunger further comprises:
   a contoured top-portion whereby the contoured top portion facilitates depressing of the plunger and provide a more ergonomic grip.

8. The combination of claim 2 wherein the housing further comprises:
   an engaging channel adapted to provide a snap-fit to the end cap when the end cap is selectively engaged to cover the open bottom portion.

9. The combination of claim 8 wherein the snap-fit end cap further comprises a resilient, water-resistant material.

10. The combination of claim 1 wherein the housing further comprises a first, vertical axis and a LED-port disposed on the housing at a second axis offset from the first, vertical axis.

11. The combination of claim 10 wherein the second offset axis is within a range of 0-degrees to about 89-degrees from the first, vertical axis.

\* \* \* \* \*